US008237080B2

(12) United States Patent
Howerton et al.

(10) Patent No.: US 8,237,080 B2
(45) Date of Patent: Aug. 7, 2012

(54) METHOD AND APPARATUS FOR LASER DRILLING HOLES WITH GAUSSIAN PULSES

(75) Inventors: Jeff Howerton, Portland, OR (US);
David Childers, Portland, OR (US);
Brian Johansen, Hillsboro, OR (US);
Mehmet Emin Alpay, Portland, OR (US)

(73) Assignee: Electro Scientific Industries, Inc, Portland, OR (US)

( * ) Notice: Subject to any disclaimer, the term of this patent is extended or adjusted under 35 U.S.C. 154(b) by 1036 days.

(21) Appl. No.: 12/056,824

(22) Filed: Mar. 27, 2008

(65) Prior Publication Data

US 2009/0242528 A1     Oct. 1, 2009

(51) Int. Cl.
*B23K 26/38* (2006.01)

(52) U.S. Cl. .......... 219/121.71; 219/121.75; 219/121.61

(58) Field of Classification Search ............... 219/121.7, 219/121.71, 121.61, 121.67–121.72
See application file for complete search history.

(56) References Cited

U.S. PATENT DOCUMENTS

| | | | |
|---|---|---|---|
| 5,117,087 A * | 5/1992 | Baker et al. | 219/121.71 |
| 5,593,606 A | 1/1997 | Owen et al. | |
| 5,744,780 A * | 4/1998 | Chang et al. | 219/121.73 |
| 5,919,329 A * | 7/1999 | Banks et al. | 156/281 |
| 6,211,485 B1 | 4/2001 | Burgess | |
| 6,222,869 B1 * | 4/2001 | Marshall et al. | 372/75 |
| 6,295,986 B1 * | 10/2001 | Patel et al. | 128/203.12 |
| 6,362,446 B1 | 3/2002 | Jones et al. | |
| 6,610,960 B2 | 8/2003 | De Steur | |
| 6,627,844 B2 | 9/2003 | Liu | |
| 6,642,477 B1 * | 11/2003 | Patel et al. | 219/121.71 |
| 6,706,996 B2 * | 3/2004 | Wybrow et al. | 219/121.71 |
| 6,946,091 B2 | 9/2005 | Nakai | |

FOREIGN PATENT DOCUMENTS

| | | |
|---|---|---|
| JP | 2001-314986 A | 11/2001 |
| JP | 2003-001450 A | 1/2003 |
| JP | 2006-130903 A | 5/2006 |

OTHER PUBLICATIONS

International Preliminary Report on Patenttability of PCT/US2009/037720.
International Search Report of PCT/US2009/037720.

* cited by examiner

*Primary Examiner* — Samuel M Heinrich (57) ABSTRACT

An improved method and apparatus for drilling tapered holes in workpieces with laser pulses is presented which uses defocused laser pulses to machine the holes with specified taper and surface finish while maintaining specified exit diameters and improved system throughput. A system is described which can also drill holes with the desired taper and surface finish without requiring defocused laser pulses.

8 Claims, 7 Drawing Sheets

METHOD AND APPARATUS FOR LASER DRILLING HOLES WITH GAUSSIAN PULSES

TECHNICAL FIELD

The present invention relates to laser processing a workpiece. More particularly, it relates to a method and apparatus for laser drilling homogenous workpieces for the purpose of forming features to permit light or other electromagnetic radiation to transmit through the workpiece. Specifically, it relates to laser drilling tapered through holes or other shaped features in a workpiece with precise exit diameters, selectable taper and a smooth finish to enhance the transmission of light or other electromagnetic radiation. More specifically it relates to drilling holes small enough to be substantially unnoticeable when unlit but transmit enough light to be easily visible when lit.

BACKGROUND OF THE INVENTION

Very small, or micromachined openings in opaque workpieces such as aluminum, stainless steel, or plastics can create surfaces that appear uninterrupted to unaided human vision. However, when light is impressed upon opposite surfaces, light appears to be coming directly from the apparently uninterrupted surfaces. It is necessary for these openings to be formed very precisely to achieve all desirable characteristics of the resulting surface including smoothness of the surface, adequate transmissibility of light, and adequately retained strength and integrity. Micromachined openings are also useful in allowing other electromagnetic fields and fluids to pass through workpieces, whether optically opaque or otherwise while avoiding degrading various desirable characteristics of the workpieces and associated surfaces.

Workpieces to be drilled in this manner comprise a variety of materials, including metals, including aluminum, various types of plastics, epoxies, and composite materials such as fiberglass or various types of clad substrates. Tapered holes can be drilled in all of these different materials, although laser pulse parameters, such as focal plane location, pulse energy, pulse duration, pulse temporal profile, pulse repetition rate, number of pulses, spot size or wavelength may have to be altered to for a particular type of workpiece.

Figure 1:
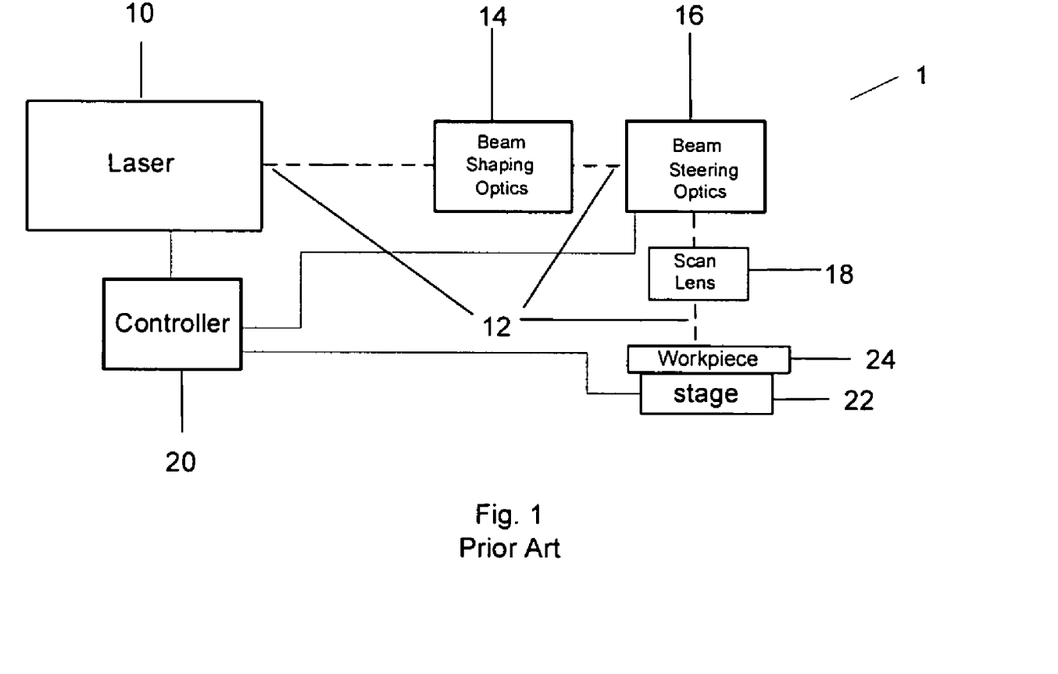
FIG. 1 is a schematic diagram showing prior art laser drilling system

FIG. 1 shows a schematic diagram of a prior art laser drilling system 1. Laser drilling systems typically comprise a laser 10 emitting laser pulses along a laser beam axis 12, beam shaping optics 14, beam steering optics 16, scan lens 18, a controller 20, and a stage 22 with motion control devices (not shown) for holding the workpiece 24 and moving it in relation to the laser beam axis in up to six axes which include translation in three orthogonal axes (X, Y and Z) and rotation about the three axes ($\rho$, $\phi$ and $\theta$). Note that the workpiece or the laser beam axis or both may be moved along or rotated about any of these axes to achieve this relative motion. The controller 20 directs the laser to emit pulses along the laser beam path and then coordinates the motions of the beam steering optics and the stage to position the workpiece to cause the laser beam path and hence the laser pulses to intercept the workpiece at the desired point at the desired time.

Hole taper is defined as the ratio of the top diameter of the hole, which is the diameter of hole as measured at the surface of the workpiece first impinged by the laser beam, to the exit diameter, which is the diameter of the hole as measured at the surface where the laser beam exits the workpiece following drilling. Taper is typically introduced into the hole by adjusting power so that only a small fraction of the hole volume is removed by each pulse and then programming the system to move the laser beam path in a decreasing spiral pattern as the laser is pulsed. Moving the laser beam path in a decreasing spiral or successively decreasing radius circular pattern, called trepanning, can drill a hole which tapers from a larger entrance diameter to a smaller exit diameter. This is made more difficult by high aspect ratio holes where the ratio of depth to diameter is greater than three to one.

Figure 2:
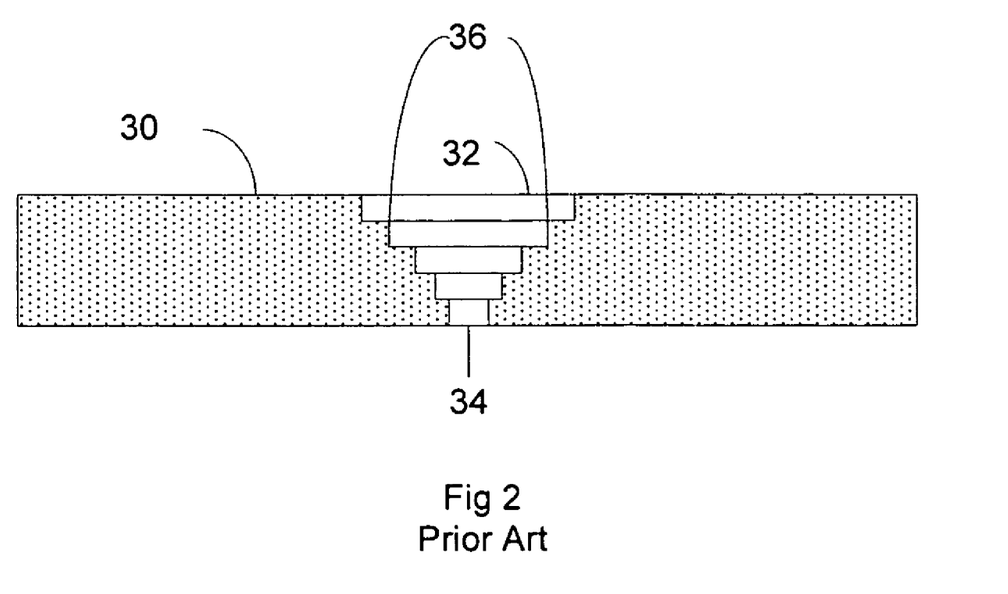
FIG. 2 is a cross-sectional view of a tapered hole drilled with prior art methods

FIG. 2 shows a schematic cross-sectional view of a prior art hole drilled by the trepanning or spiral methods. FIG. 2 shows the workpiece 30, the top diameter 32, the exit diameter 34 and the stair stepped side walls 36. Not shown in this schematic drawing is the rough nature of the surface finish on the stair stepped sidewalls. When a laser pulse removes material from the hole, the material is ejected from the location where the pulse strikes the workpiece in gaseous, liquid and possibly solid form. As the laser beam, which is focused into a much smaller spot size than the diameter of the hole, is moved to another location to deliver the next pulses, the locations already drilled have a chance to cool. This permits the material ejected by subsequent pulses to cool and stick to the previously drilled surfaces, causing a roughened surface. The stair-stepped side walls and the rough surface finish combine to yield a hole that transmits light unevenly. Holes drilled in this manner will present differing appearances with the uneven sidewalls reducing the total amount of light and causing each hole to transmit light unevenly, thereby causing a pattern of holes to present an uneven appearance. This effect will also cause the appearance of the lit hole to change unevenly with varying viewing angles.

One reason this problem exists is that in order to meet the requirements for precision and throughput, existing systems designed for drilling vias in circuit boards are used to drill these holes. An exemplary system of this type is the Model ICP5650 laser drill system manufactured by Electro Scientific Industries, Inc., Portland, Oreg. These systems are typically designed to drill small blind vias in circuit board materials with UV lasers using the trepanning methods described above. While these systems have the reliability and power to drill tapered holes with the desired precision and throughput, the final product is less than desirable.

Thus, two problems exist when drilling tapered holes in this fashion. The first is that many pulses are required to drill a hole in this manner. The speed with which holes can be drilled is a function of both pulse repetition rate and the speed with which the laser beam path can be accurately moved from point to point. These factors limit the speed with which a taper hole can be drilled and hence the throughput of the system. The second is that drilling a tapered hole in this fashion leaves the interior surface of the hole rough and uneven as a result of being formed by successive laser pulses. Although the desired exit hole diameter and location of the holes can be achieved fairly accurately with this method, the uneven finish on the side walls causes the holes to vary in appearance, with some holes appearing lighter or darker than others. In addition, the uneven geometry of the side walls causes the holes to change in appearance with changes in viewing angle, another very undesirable effect.

Accordingly, there is a continuing need for an apparatus for laser drilling tapered holes in substrates, capable of forming relatively smooth, high quality holes with predictable exit hole diameters, while maintaining improved system throughput.

SUMMARY OF THE INVENTION

An object of the present invention is, therefore, to provide a method and apparatus in the form of a laser processing system with improved ability to micromachine high quality tapered holes in workpieces. To achieve the foregoing and other objects in accordance with the purposes of the present invention, as embodied and broadly described herein, a method and apparatus is disclosed.

To achieve this effect, the holes have to be drilled very precisely. First the spacing of the holes has to be carefully controlled in order to achieve the correct light output from the finished workpiece. Second, the exit diameter of the holes has to be exact in order to be virtually undetectable when unlit. Third, the taper of the holes has to be exact in order to gather the correct amount of light and to allow viewing from a consistently wide angle. Fourth, the finish of the inside of the hole needs to be controlled in order to promote even illumination over the desired viewing angle. Finally, the exit hole should be free of debris in order to enhance the virtual invisibility of the unlit hole. In addition these holes are sometimes filled with light conducting material to prevent gas or liquids from penetrating the hole and for mechanical stability. In this case the smooth sidewalls enhance the ability to fill the holes and increase the adhesion between the sidewalls and the filler.

In one embodiment hole quality is improved by moving the focal point of the beam from being coincident with the surface of the workpiece being machined. Rather than focus the beam to match the power and $1/e^2$ diameter of the laser pulse to the desired exit diameter and set the focal point at the surface of the workpiece, the laser beam path is aligned to the center of the desired hole location and the focal point is set a precise distance above or below the top surface of the workpiece. Typical ranges for the distance above or below the workpiece range from 1 to 1000 microns, or more preferably 10 to 500 microns, or even more preferably 50 to 200 microns. The spot size is then adjusted to yield the desired exit hole diameter. Preferred $1/e^2$ spot sizes as measured at the surface of the workpiece range from 1.5 times the desired exit hole to 10 times the exit hole diameter, more preferably 2 times the diameter to 5 times the diameter, and even more preferably from 1.5 times the diameter to 2.5 times the diameter. Power is then adjusted to yield the fastest drilling time consistent with achieving the desired exit diameter.

Figure 3A:
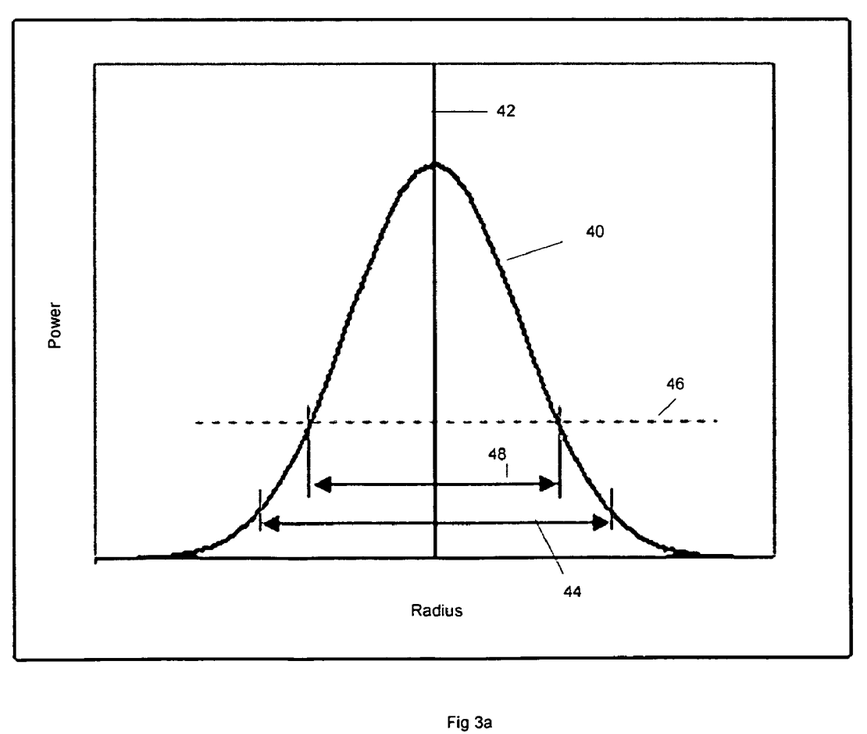
FIG. 3a is a cross-sectional diagram of a Gaussian laser pulse

Drilling a hole with one or more laser pulses can yield exit holes with a diameter smaller than the $1/e^2$ diameter of the laser pulses. The reason for this is illustrated in FIG. 3a. FIG. 3a shows a cross-sectional view of a Gaussian laser pulse, plotting power vs. displacement from the optical axis 42. As is shown in FIG. 3a, the power of each laser pulse can be adjusted so that the ablation level 46, which represents the amount of power required to ablate a particular material, is greater than the power level at the $1/e^2$ level represented by the $1/e^2$ diameter 44. As a consequence, this pulse will remove material from the workpiece within the ablation diameter 48 but not greater, thereby drilling a hole with an exit diameter smaller than the $1/e^2$ diameter of the beam.

Figure 3B:
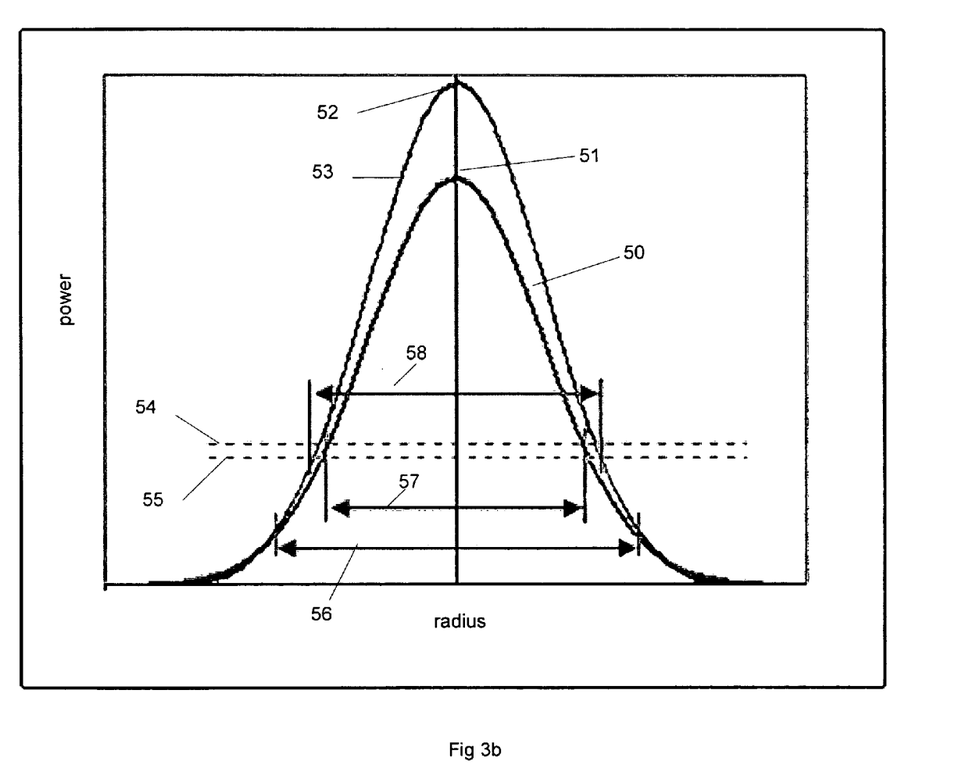
FIG. 3b is a cross-sectional diagram of two Gaussian laser pulses with differing peak power.

Another benefit of ruing this method to drill holes is that once the $1/e^2$ diameter is selected, the exit diameter of the hole is relatively insensitive to changes in pulse energy. Relatively large changes in pulse power or duration result in small changes in the exit hole diameter. This is illustrated in FIG. 3b, which shows cross-sectional views of the spatial power distribution of a first Gaussian pulse 50 with peak power 51 and a second Gaussian pulse 53 with peak power 52 that is 125% of the peak power 51 of the first Gaussian pulse 50, while maintaining the same $1/e^2$ diameter 56. Because of the slope of the Gaussian at the ablation thresholds 54 and 55, the difference between the ablation diameter 57 of the first pulse and the ablation diameter of the second pulse 58 is far less than 25%, thus proving that changes in peak power of Gaussian pulses cause correspondingly less change in the ablation diameter of the pulse. Thus, the size of the exit diameter of the drilled hole is relatively insensitive to changes in peak power of the pulse.

A third benefit of this method is that drilling holes in this fashion left the interior surface of the hole with a smooth, tapered finish, which improves the ability of the hole to transmit light evenly. The taper produced with this method is very consistent and relatively insensitive to peak power and number of pulses.

In this second embodiment of this invention, the focal point is placed at the surface of the workpiece and the focal point is enlarged so that the desired $1/e^2$ diameter of the pulse is achieved at the top surface of the workpiece. This is achieved by designing a system to produce the appropriate spot size, shown schematically in FIG. 6. This system produces laser pulses with the desired parameters including spot size while also providing the precision and throughput desired for this application by selecting the laser to produce laser pulses with the appropriate characteristics including pulse energy and wavelength. In addition, the beam shaping optics and beam steering optics are selected to produce the spot size and other laser beam characteristics desired. The controller is also programmed to coordinate the activities of the system components to achieve the desired results.

The result of this approach is that it dispenses with the need for an f-theta or scan lens placed after the beam steering component. An f-theta, or scan lens, is typically required for precision micromachining systems that employ beam steering optics for two reasons. The first is that transmitting a tightly focused laser pulse through beam steering optics increases the path length in a variable fashion, thereby making it difficult to maintain the focal spot at the precise location with respect to the workpiece. In addition, the f-theta lens allows the laser beam path to be perpendicular to the workpiece over the entire range of travel of the beam steering optics, which is required when trepanning is used to drill the holes. Using a larger focal spot size increases the depth of field enough to eliminate the need for an f-theta lens. More particularly, the weak focusing required by this method combined with the use of Gaussian spot geometry means that the lens can be a standard lens instead of and f-theta lens. In addition, the lens can be placed either in front of or behind the steering mirrors with no change in performance of the system. In addition, the superior hole geometry and smooth finish eliminate the need for precise perpendicularity over a scan area large enough to be useful for the applications described herein.

DETAILED DESCRIPTION OF PREFERRED EMBODIMENTS

The first embodiment of this invention drills tapered holes in homogeneous and non-homogeneous materials having controlled exit diameters and smooth finishes on interior surfaces. In the first embodiment these holes are drilled using a prior art laser drilling system shown in FIG. 1. FIG. 3a shows a cross sectional diagram of a Gaussian laser pulse 40, plotting power vs. displacement from the optical axis 42 of the laser beam path. The diagram shows the $1/e^2$ diameter 44, the ablation threshold 46 for a typical workpiece and the radius of the Gaussian laser pulse at the ablation threshold 48. The ablation threshold is the power level above which material is removed from the workpiece by the laser pulse. The depth of material removed by the pulse within the diameter of the pulse above the ablation threshold is related to the pulse duration; the longer the pulse duration, the more material is removed.

Figure 4:
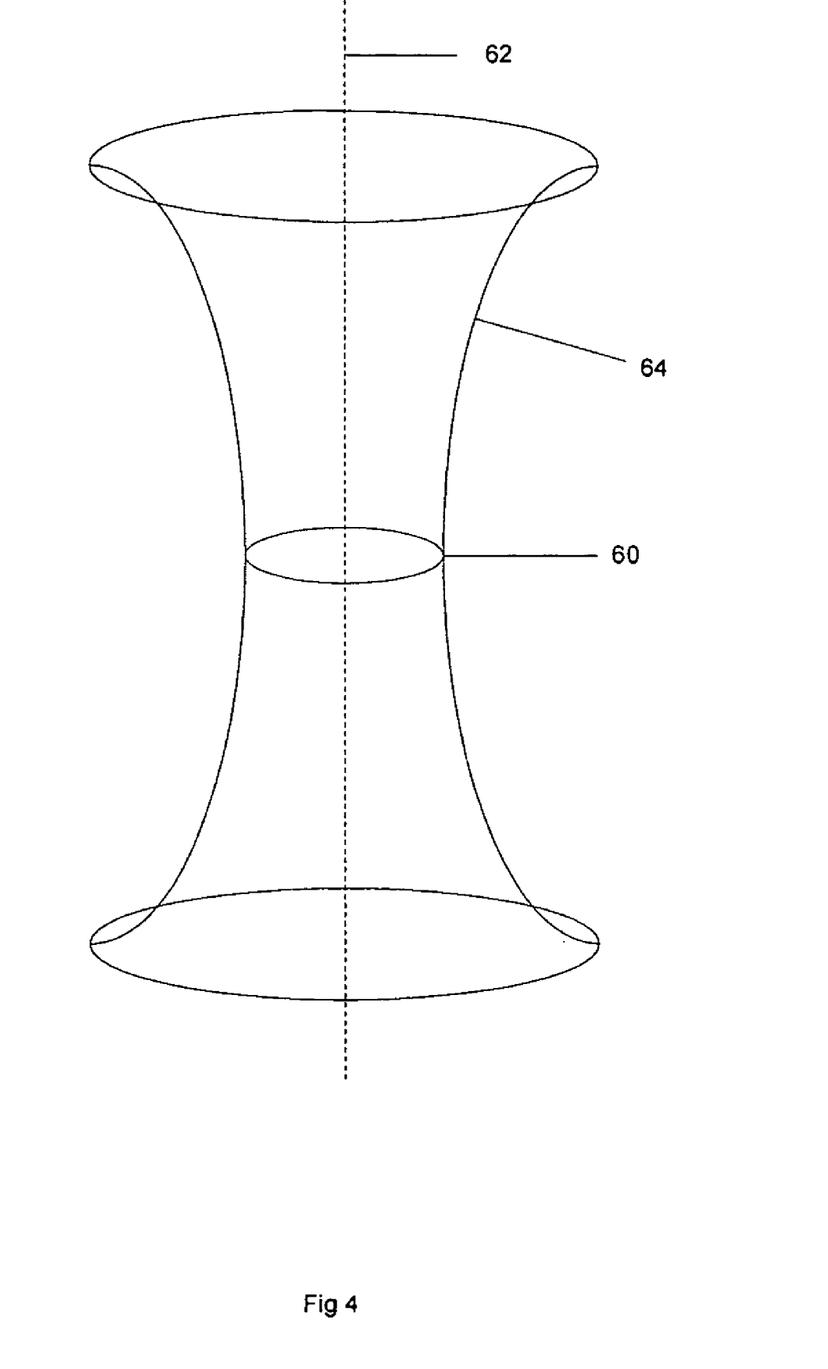
FIG. 4 is a cross-sectional diagram of a Gaussian laser pulse focal spot.

FIG. 4 shows a schematic diagram of a laser beam in the vicinity of the focal spot 60. The surface 64 represents the $1/e^2$ diameter of the laser pulse as it travels along the laser beam path optical axis 62. Note that any other measure of laser pulse diameter, such as FWHM could be used to create this type of schematic diagram with similar results. The volume in the vicinity of the area defined by the line 60 is the focal spot or beam waist. The term spot size refers to a measure of the area defined by the line 60. In the case of laser pulses with substantially circular cross-sections, this can be represented by the diameter of the area.

Figure 5:
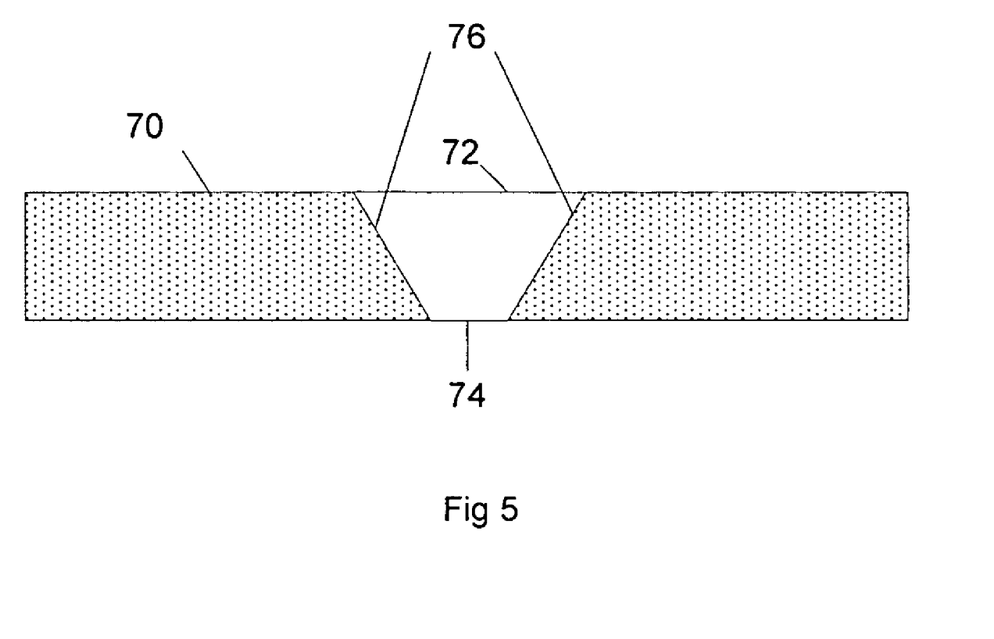
FIG. 5 is a sectional view of a workpiece showing a hole drilled with the method and apparatus of the instant invention.
Figure 6:
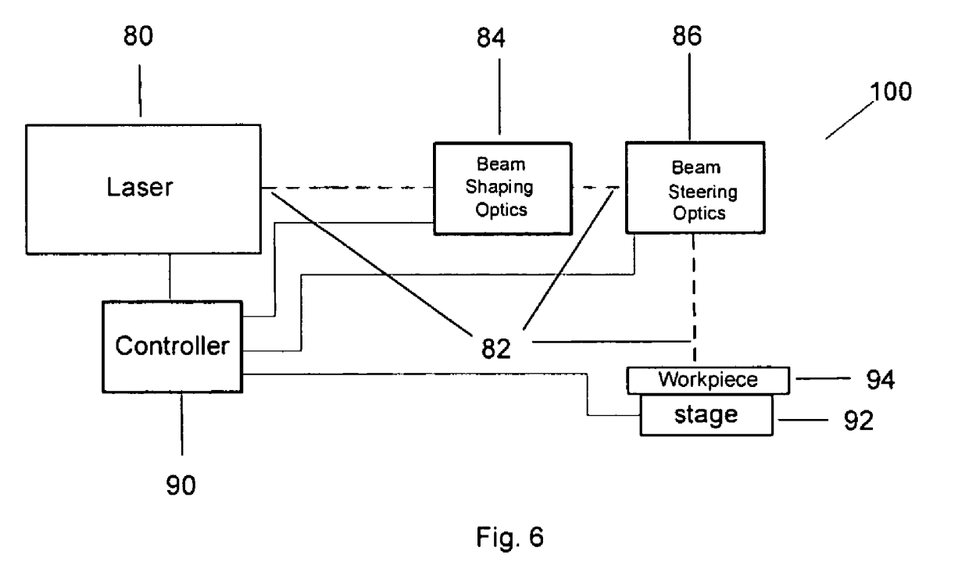
FIG. 6 is a schematic diagram of an embodiment of this invention.

FIG. 5 shows a hole drilled by the instant invention in a substantially homogeneous metallic material 70. The top diameter 72 and the exit diameter 74 define the taper. The side walls 76 are smooth and even from top diameter 72 to exit diameter 74. This type of hole is desirable because it transmits light evenly over a wide viewing angle. It is also highly repeatable. Holes drilled using the instant invention all tend to have the same exit diameter, taper and smooth side walls. This means that multiple holes drilled in a surface will transmit light in a similar fashion and thus have a substantially similar appearance over a wide viewing angle. This means that if the holes are drilled to form a pattern or design the pattern will have a similar appearance over a wide viewing angle, a very desirable result which could not be achieved with prior art methods Another embodiment of this invention employs a laser drill especially designed to form these types of holes. The system designed specifically for drilling these types of holes has the capability of forming focal spot sizes very much larger than prior art laser drills. Prior art laser drills typically form laser beams with spot sizes of about 100 microns diameter and smaller. A schematic diagram of a system 100 which achieves these results is shown in FIG. 6. The system contains a laser 80 which transmits laser pulses along a laser beam path 82. The laser pulses pass through beam shaping optics 84 which shape and size the laser beam possibly in both temporal and spatial extents. The beam then passes through optional beam steering optics 86 to the workpiece 94 which is supported by the motion control stage 92. All the elements of this system operate under control from a controller 90 which coordinates and commands each element.

The laser 80 is typically a Q-switched solid state laser using a Neodymium doped $YVO_4$, YAG or YLF crystal to produce laser pulses at a repetition rate greater than 10,000 pulses per second at an energy of at least 1.0 microjoule per pulse. These lasers typically produce pulses with wavelengths in the infrared region of the spectrum, typically ranging from 1.0 microns to 1.3 microns. These pulses are then subjected to frequency conversion, a process by which the laser pulse passes through one or more frequency doubling crystals to produce wavelengths ranging from green, which is approximately 550 nm to ultraviolet, in the range from 255 to 365 nm. In addition, any one of a number of lasers operating at a variety of wavelengths could be used advantageously with this process, including CO2 or other gas lasers operating in the IR region of the spectrum or any one of a number of fiber lasers.

The laser pulses are then processed by the beam shaping optics 84, which can alter the pulse emitted from the laser in both temporal and spatial ranges. Temporal modification of the laser pulse is typically accomplished by optical devices such as acousto-optic modulators or electro-optic modulators in conjunction with other optical elements such a polarizers that can slice the pulse to change the pulse shape or deflect the pulse to prevent it from reaching the workpiece. The pulse can also undergo spatial modifications including collimation, where the pulse is shaped to provide optical propagation along rays parallel to the laser beam path, beam shaping by conventional or diffractive optics to create a desired pulse cross section such as a "top hat" beam or apertures to shape the limits of the pulse, along with more conventional lenses which create the desired spot size on the workpiece. In addition, due to the large focal spot size used in this embodiment, the beam shaping optics 84 can perform all of the required focusing of the laser beam since no f-theta lens is required.

The beam steering optics, 86, typically implemented with galvanometers or other beam steering devices such as piezoelectric or voice coil steered mirrors function in concert with the motion controlled stage 92 to position the laser beam path in relation to the workpiece in order to drill the holes in the proper position. Note that, depending upon the exact configuration of holes desired, either the motion control stage, the beam steering optics or both may be used to position the laser beam path in relation to the workpiece.

It will be apparent to those of ordinary skill in the art that many changes may be made to the details of the above-described embodiments of this invention without departing from the underlying principles thereof. The scope of the present invention should, therefore, be determined only by the following claims.

We claim:

1. An improved method for forming a through hole in a workpiece, including the steps of producing a laser pulse with a laser, modifying said laser pulse with optics, and directing said laser pulse to impinge upon said workpiece, said through hole having a taper, a surface finish and an exit diameter, said workpiece including substantially homogeneous metallic material and having a top surface and an ablation threshold, said laser pulse having a spot size, a pulse duration and a peak power, the improvement comprising the further steps of:

producing, with said laser, said laser pulse, said laser pulse having said peak power at least about 20% greater than said ablation threshold of said workpiece and said pulse duration greater than 10 nanoseconds;

modifying, with said optics, said laser pulse to have said spot size having a $1/e^2$ diameter at said top surface of said workpiece greater than about two times said exit diameter of said through hole; and directing said at least one modified laser pulse to remove material from an intended volume of said workpiece thereby creating said through hole with said exit diameter, said surface finish and said taper.

2. The method of claim 1 where the $1/e^2$ diameter of said spot size is between 2 and 5 times said exit diameter.

3. The method of claim 1 where the $1/e^2$ diameter of said spot size is about 2.5 times said exit diameter.

4. The method of claim 1 where said peak power of said laser pulse is between about 20% greater than said ablation threshold and 100% greater than said ablation threshold.

5. The method of claim 1 where said peak power of said laser pulse is about 50% greater than said ablation threshold.

6. The method of claim 1 where said pulse duration of said laser pulse is between about 10 nanoseconds and one microsecond.

7. The method of claim 1 where said pulse duration of said laser pulse is between about 10 nanoseconds and 100 nanoseconds.

8. The method of claim 1 where said surface finish is substantially smooth.

* * * * *